US006963638B1

(12) United States Patent  (10) Patent No.: US 6,963,638 B1
Keller  (45) Date of Patent: Nov. 8, 2005

(54) METHOD FOR USING ALPHANUMERICAL SIGNS AS A CALL NUMBER

(75) Inventor: Walter Keller, Ratingen (DE)

(73) Assignee: T-Mobile Deutschland GmbH, Bonn (DE)

( * ) Notice: Subject to any disclaimer, the term of this patent is extended or adjusted under 35 U.S.C. 154(b) by 430 days.

(21) Appl. No.: 10/111,788

(22) PCT Filed: Oct. 27, 2000

(86) PCT No.: PCT/DE00/03788

§ 371 (c)(1),
(2), (4) Date: Jul. 23, 2002

(87) PCT Pub. No.: WO01/35619

PCT Pub. Date: May 17, 2001

(30) Foreign Application Priority Data

Oct. 27, 1999 (DE) .................... 199 51 827

(51) Int. Cl.$^7$ ............... H04M 7/00; H04M 11/00; H04L 12/66
(52) U.S. Cl. ................. 379/229; 379/93.17; 370/354
(58) Field of Search ................. 379/93.17, 229; 370/354

(56) References Cited

U.S. PATENT DOCUMENTS 5,485,512 A  1/1996  Bogart et al. ......... 379/221.14
6,496,501 B1 *  12/2002  Rochkind et al. ......... 370/354
6,553,106 B1 *  4/2003  Gould et al. ............. 379/93.17

FOREIGN PATENT DOCUMENTS

| DE | 43 33 398 A1 | 4/1995 |
| DE | 195 15 856 A1 | 10/1996 |
| EP | 0 941 009 A2 | 3/1999 |

OTHER PUBLICATIONS

International Search Report mailed Apr. 18, 2001.
"Routing Service for the Provision of Number Portability", Lautenschlager et al. Proceedings of ISS'97, vol. 2, Sep. 21-26, 1997, pp. 235-242.

* cited by examiner

Primary Examiner—Ahmad F. Matar
Assistant Examiner—Thjuan P Knowlin
(74) Attorney, Agent, or Firm—Baker & Daniels

(57) ABSTRACT

A method for using alphanumeric characters for a call number to establish a phone connection and for internal signaling in and between telecommunication networks. An alternative additional dialing method on an alphanumeric basis by using the complete character set of the ASCII character set with its national embodiments (alphanumeric subscriber call number ATR) with any length of the ATR freely set by the subscriber as an optional alternative that coexists with the current dialing method with a decimal number system (NTR). The ATR is sent from the terminal to the switching center and used preferably to establish a connection or converted to an NTR that is used to establish the connection with the target subscriber. The method may be introduced as an overlay process for the existing dialing method within existing networks.

23 Claims, 11 Drawing Sheets

Overview about the coding of D3 protocol data elements according to DSS1

| Octet | 8 | 7 | 6 | 5 | 4 | 3 | 2 | 1 | |
|---|---|---|---|---|---|---|---|---|---|
| 1 | 0 | 1 | 1 | 1 | 0 | 0 | 0 | 0 | Called party number<br>Information element identifier |
| 2 | | | | | | | | | Length of called party number contents |
| 3 | 1<br>ext | | Type of number | | | Private numbering plan identification | | | |
| 4<br>etc | 0 | | | | | | | | Number digits (in octets) |

Extracted from ETS 300 102-1, status: December 1999 (Called Party Number Information Field)

Fig. 5

| 8 | 7 | 6 | 5 | 4 | 3 | 2 | 1 | Octet |
|---|---|---|---|---|---|---|---|---|
| 0 | 1 | 1 | 1 | 0 | 0 | 0 | 0 | 1 |
| | | | Called party number<br>Information element identifier | | | | | |
| | | | Length of called party number contents | | | | | 2 |
| 1<br>ext | | Type of number | | | Private numbering plan | | | 3 |
| | | 0 | 0 | 1 | 0 | 0 | 1 | |
| | | | Exit to „National Numbering Plan"<br>or definition of „National Character Set" | | | | | 4 |
| | | | ATK | | | | | 5<br>etc. |

Extracted from ETS 300 102-1, status: December 1999 (Called Party Number Information Field)

Fig. 6

| Information elements | ALERTING | CALL PROCEEDING | CONNECT | CONNECT ACKNOWLEDGE | DISCONNECT | INFORMATION | NOTIFY | PROGRESS | RELEASE | RELEASE COMPLETE | SETUP | SETUP ACKNOWLEDGE |
|---|---|---|---|---|---|---|---|---|---|---|---|---|
| Bearer capability | | | | | | | | | | | M | |
| Cause | | | | | M | O | | | O | O | | |
| Channel identification | O | O | O | O | | | | | | | O | O |
| Progress indicator | O | O | O | | O | | | M | | | O | O |
| Notification indicator | | | | | | | M | | | | | |
| Display *) | O | O | O | | O | O | O | O | O | O | O | O |
| Date / Time | | | O | | | | | | | | | |
| Calling party number | | | | | | | | | | | O | |
| Calling party subaddress | | | | | | O | | | | | O | |
| Called party number | | | O | | | | | | | | O | |
| Called party Subaddress | | | | | | O | | | | | O | |
| Low layer compatibility | | | | | | | | | | | O | |
| High layer compatibility | | | | | | | | | | | O | |
| Sending complete | | | | | | | | | | | O | |
| Facility **) | O | | O | | O | | | O | O | O | O | |
| User-user **) | O | | O | | O | | | | O | O | O | |

*) Information element will only be used in direction n -> u
**) These information elements are only used for the handling of service features O = Optional information element ("optional")
M = Mandatory element ("mandatory")

Note: Optional information elements can be a mandatory indication for a certain direction or a certain application

Fig. 7

Information elements (I.E.) of the messages of the basic procedure (from Lit. 1, p. 41)

METHOD FOR USING ALPHANUMERICAL SIGNS AS A CALL NUMBER

CROSS-REFERENCE TO RELATED APPLICATION

This is a 371 of PCT/DE00/03788 filed Oct. 27, 2000.

BACKGROUND OF THE INVENTION

The invention concerns a process to use alphanumeric characters for call numbers for connections and for signaling within and between telecommunications networks (call by name).

The calling methods in telecommunications networks for fixed-lines networks have progressed from impulse dialing methods (manual connection, rotary dial switching, push-button set module) via multiple frequency methods to digital signaling methods, such as the D-channel DSS1 protocol (Ref. 1) within the Integrated Services Digital Network ISDN (Ref. 2).

Here the dialing method relies on the use of the numerical sequence 0 . . . 9, where the decimal dialing categories form the corresponding hierarchical network topology. Thus, the digit "0" is generally used as the traffic separator for access to the long-distance network, where the subsequent digit identifies the top network level of one of 9 regions (1 . . . 9=9 regions). The input of additional digits identifies successively subordinated network hierarchical levels (regional switching centers, local switching centers, etc). Subsequent additions, such as the development of private telecommunications networks, specific service numbers, etc., further limit the supply of numbers, by reserving certain blocks of numbers for specific purposes. For example, the number 0171 is used to access the D1 mobile network, the number 0800 is reserved for service purposes, etc. This is necessary because the supply of numbers and the (reasonable) maximum number of digits possible in a decimal system are limited.

This method was standardized internationally by CCITT, later ITU or ETSI, and it was maintained for reasons of compatibility in the digital networks, such as the ISDN network or the GSM network. This guarantees in principle that all end users can reach each other, regardless of the signaling technology and terminals.

The method in principle of this numerical signaling method is defined in the international numbering plan (Ref. 3). This also specifies the maximum number of digits and their division into country code (CC), national destination code (NDC), and subscriber number (SN) on an international level, where the maximum number of digits of a call number on an international level is limited to 15 digits.

The digital signaling system DSS1 in the ISDN network should be seen as the reference system for all modern digital signaling systems. In principle, all corresponding modifications or augmentations of corresponding signaling methods, such as for the GSM network, are derived from it. The same applies by implication for the signaling method between the switching centers of a network or internationally between switching networks. All modern signaling systems are based on the digital signaling system SS7 (Central Channel Signaling System No. 7, Ref. 14).

Thus, the air interface of modern cellular mobile telephone networks, such as the GSM network, uses a modified DSS1 protocol architecture on level 3, ISDN switching centers and an appropriately augmented SS7 signal in the switching area, where the method in connection and service management is largely identical to that of the ISDN network, but where it is specifically augmented by mobility management specific to mobile telephone communication and guaranteed transmission in the air interface. This method (Ref. 4, starting on page 118) assures an optimally fast development of standards and networks plus, among others, common services, such as call forwarding, conference calls etc. between mobile telephone networks and fixed networks.

However, the current numerical dialing method contains additional disadvantages, which are explained in the following.

The maximum number of digits is set internationally (see above). Thus, after subtracting the international access codes, the country code, the domestic destination code, the local destination codes and the subscriber number, at most 4 digits remain for direct dialing into private telecommunications networks (direct dialing to an extension).

In the US, where long numbers were the norm very early on due to the large number of subscriber connections in the urban areas (for example New York), the telephone keys (or the numerical switches) were also labeled with letters, where each digit from 1–9 was normally associated with 3 letters of the alphabet (FIG. 1). Thus, a telephone number could be shown as a combination of letters and numbers, which, in the opinion of some experts, was easier to be memorized than a string of numbers. Using the same argument, the license plates of automobiles in Germany were designed to use strings of letters and numbers. However, such labeling does not modify the decimal telephone dialing method, because the mere label does not enlarge the supply of numbers available for dialing.

The multiple labeling of the keys also makes it feasible in principle to use "alphabetic dialing" (FIG. 1). For example, a firm named "HUT GmbH and Co KG" could be dialed using the three digits 4-8-8 (HUT). As FIG. 4 shows, this method is also used in Germany. For example, network-independent call numbers (beginning with 0700 . . . ) are offered by providers or service call numbers (beginning with 0800 . . . ) are offered by Telekom.

The problem with these so-called vanity call numbers is that this method can lead to conflicts by the several-to-one relationship of letters to numerical digits and to problems in the number of digits dialed.

For example, under the several-to-one relationship, the firm "GUT" would have the same digital number as the firm HUT of the previous example. Furthermore, a shortened call number blocks all longer call numbers that have the same initial numeric string. Assuming a nine-digit call number, the firm HUT of the previous example would block the last 6 digits (00 00 01 to 99 99 99), i.e. this would block a set of call numbers of almost a million subscribers. This is the reason, why the so-called vanity numbers are marketed in the USA at such high prices. The problem of blocked numbers derives from continuing to dial numbers, regardless of how the keys or dialing wheels are labeled. Using single number dialing, the network has no criteria to determine the end of the dialed number, so that the network cannot recognize the name HUTFEDER by this method. The string FEDER would in this case be treated as dialing the corresponding digits 33337 after connecting to the switchboard of the subscriber HUT (488). It is not possible to dial any other subscriber in this case.

An alternative to this loss of call numbers due to short vanity call numbers uses a vanity call number for a firm or a person as a personal call number with a defined length based upon the network hierarchy. At least this method will not block any longer call numbers.

However, such a method is usually only of limited usefulness, as will be shown in the following. Thus, in the previous example, the firm "HUT", which may be located in a metropolis like Berlin with nine digit telephone numbers, would need to specify six additional digits or letters to complete its identification. If this is a large firm with two reserved digits for direct dialing, then the call number is shortened by two digits. One could then use, for example, HUTBERL0 or HUTGMBH0 to refer to the firm HUT in Berlin, where the ending "0" refers to the switchboard of firm HUT. However, the impact of such a call number is rather questionable. Nobody familiar with the firm HUT would associate such a vanity call number with the firm. The example shows that a vanity call number is very unlikely to work in the case of a direct-dial company telecommunication system. Use of the current vanity method for alphabetic dialing is thus restricted to a network-wide call number for a service or sales contact office, for example.

The listed examples may be abstract, but the problem can be identified by presuming to use the method with well-known firms, such as IBM, Bosch, Siemens, or firms with a longer name, such as "DeTeMobil Deutsche Telekom Mobilnet GmbH". Here one will quickly see that the vanity method cannot yield the intended result of intuitive dialing based on the name, given the current length of call numbers. This also applies to the use of names in the private sector. Given that there are numerous persons with identical names as others, the applicability will be limited. The probability of inappropriate connections will likely rise dramatically, if one wishes to reach Mr. "Maier", first name "Werner", in "Berlin" with an unknown call number, particularly if the caller does not know the length of the phone numbers used in Berlin.

The Internet now commonly uses a better method that does not need to rely on historical precedence and the parallel existence of current infrastructure and subscriber phones. Thanks to the common PC keyboard, alphanumeric addresses of any length may be used based on the Uniform Resource Locator URL (Ref. 5), which has very few restrictions of the type listed above. An Internet router can perfectly well distinguish the address HUT.de from the address HUTFEDER.de. The only restriction is that there cannot be multiple firms of the same name in the same domain (for example, the same country). There is an additional disadvantage from the immediate connection established whenever the name is input (URL address input via Internet browser). Even though this is no problem in principle in the Internet, downloading the wrong web pages generates unnecessary costs and lost time from the transfer of undesired information. In the case of voice or data connections, such erroneous connections leads to unintended problems and unnecessary connection costs. This may be demonstrated easily by means of an e-mail connection. For example, the e-mail addresses "Mister.President@T-Online.de", "MisterPresident@T-Online.de" and "Mister-President@T-Online.de" are clearly three different names or Presidents. Transfer of e-mail with attachments can easily lead to problems in cases of name confusion. This shows the disadvantages of alphanumeric address methods where there is no possibility to identify the target participant prior to the exchange of information.

U.S. Pat. No. 5,485,512 identifies a method to use alphanumeric characters as call numbers to establish connections within and between telecommunication networks, where an alphanumeric subscriber call number is used for dialing by name, rather than the usual decimal number. The length and the characters used in the character string may be essentially freely defined by the subscriber. Because only the alphanumeric character string is used to establish the connection, the use of the proposed system requires substantial costs, as all technical installations of the telecommunication system in question starting from the switching center will need to be retrofitted.

SUMMARY OF THE INVENTION

The present invention has the objective of proposing a system that allows for an improved dialing by name in telecommunications networks with minor technical costs.

The invention concerns a method to use alphanumeric characters for a call number to establish a phone connection and for internal signaling in and between telecommunication networks (dial by name/alias), where the method of the invention is primarily in digital fixed line networks under the ISDN standard and in cellular mobile phone networks, but could be used optionally in all networks, which contain at least a computerized switching center and central channel signaling (SS7, DSS1 or similar).

The method of the invention envisions the introduction of an alternative additional dialing method on an alphanumeric basis by use of the complete character set of the ASCII character set with its national embodiments (alphanumeric subscriber call number ATR) with any length of the ATR freely set by the subscriber as an optional alternative that coexists with the current dialing method with a decimal number system (numeric subscriber call number NTR), where the ATR rather than the usual NTR is sent from the terminal to the relevant switching center in the telecommunication network during the dialing process to be used directly to establish a connection or where it is alternatively converted in a preferable embodiment by a suitable conversion unit into an NTR that is used to establish the connection with the target subscriber.

The character string may consist of any combination of numbers, letters and special characters. This method may be introduced as an overlay process for the existing dialing method within existing networks without mutual interference, where the use of a single method in any individual network is also possible. It also facilitates direct access in telecommunication networks and, for example, the public Internet or access to a phone subscriber via his e-mail address and other name identification.

If the method of the invention modifies and augments existing network technology without requiring independent and totally new networks, as was indicated above by reference to signaling considerations in principle, then the objective according to the invention is already achieved, when a solution is found on the basis of modified ISDN protocols. This may be applied by logical extension at least in digital signaling systems of various networks, in switching between switching centers, or, in international applications, by logical conversion of the corresponding protocol elements of other signaling protocols; thus, it may be used worldwide in widely differing networks.

The method of the invention proposes the introduction of an alternative additional dialing method on an alphanumeric basis (Alphanumerische Teilnehmeranrufnummer ATR [alphanumeric subscriber call number]) with an unrestricted length of the character string in addition to the current dialing method with a decimal numeric system (Numerische Teilnehmeranrufnummer NTR [numeric subscriber call number]), where the ATR is transmitted from the terminal to the respective switching center of the telecommunications network during the process of establishing a connection, rather than the NTR, and is either used directly to establish the connection or is alternatively used to translate the call number into a numeric string/NTR to establish the connection to the target subscriber. The ATR character string may consist most advantageously of any desired combination of numbers, alphabetic characters, capitalized or not, and special characters. This method may be introduced as an overlay method to the current dialing method within existing networks without mutual interference, which also makes it possible to introduce the method as the only method within specific networks. It is also possible to use it for complete addressing in telecommunications networks and, for example, in the public Internet, or to enable contacting a telecommunication subscriber through his e-mail address and other name identification.

The method described in the invention is based on the appropriate expansion of existing protocol structures in the subscriber connection area, and optionally between the switching centers.

In principle, the method requires the transmission to the caller's switching center of an alphanumeric character string (ATR), which may be edited, for example, by a corresponding terminal operating system, initially in the terminal display. There the switching computer VR, which handles the signal or the connection in the switching center, recognizes the ATR as such and replaces the alphanumeric character string, which must be seen as an alias, by the corresponding conventional numeric string (NTR), after which the connection is handled in the conventional manner. This method involves no other network signaling protocols or switching-apparatus, other than the switching center on the subscriber's side. The NTR may be associated as identification internal to the network in a manner transparent to the subscriber, if he desires merely the ATR. However, usually each telecommunication network subscriber needs a numeric call number, so that he can be reached from any terminal.

Because the search and designation of a call number, particularly during periods with many simultaneous calls, requires significant additional computing capacity and a high volume of disk storage for tables or databases, while the structure of these tasks deviates from the normal connection tasks of the switching computers and the additional work, such as database back-up, telephone book look-up etc, increase the work load, the invention assumes that the acquisition of the corresponding NTR will most advantageously be relocated to an additional processing unit (Translation Unit TU), which will be located in each switching center of the access network or connected to it. This method of operation has the least amount of cost and risk, at least for the introduction of this method into existing networks, because the switching centers can be augmented relatively easily in software and hardware by the corresponding interface and additional protocol functionality.

An additional advantage is generated, for example, if the TU can exchange DSS1 signals with the terminal EG of the calling subscriber during the address translation phase. This can facilitate, for example, a telephone book look-up between TU and subscriber or at least the acknowledgment of the connection request with the identification of the target subscriber (e.g. complete name with optional address or the like) prior to the connection, where the TU transmits the relevant information, such as telephone book excerpts, subscriber identification etc., to the terminal EG, where it may be displayed and where the subscriber would either select or confirm the desired target subscriber prior to the establishment of the connection or would supply the remainder of the call number. The entire operation is treated as a component of the translation of the call number.

BRIEF DESCRIPTION OF THE DRAWINGS

The invention is described by use of figures, which here show merely one potential embodiment by the example of an ISDN network in schematic form, where additional uses and claims are derived from the figures.

FIG. 5 Current CPN Format in the DSS1 Protocol

FIG. 6 CPN Format in the DSS1 Protocol as Modified by the Invention

FIG. 7 IE List of Message Types of the DSS1 Protocol on Level 3

DETAILED DESCRIPTION

Figure 1:
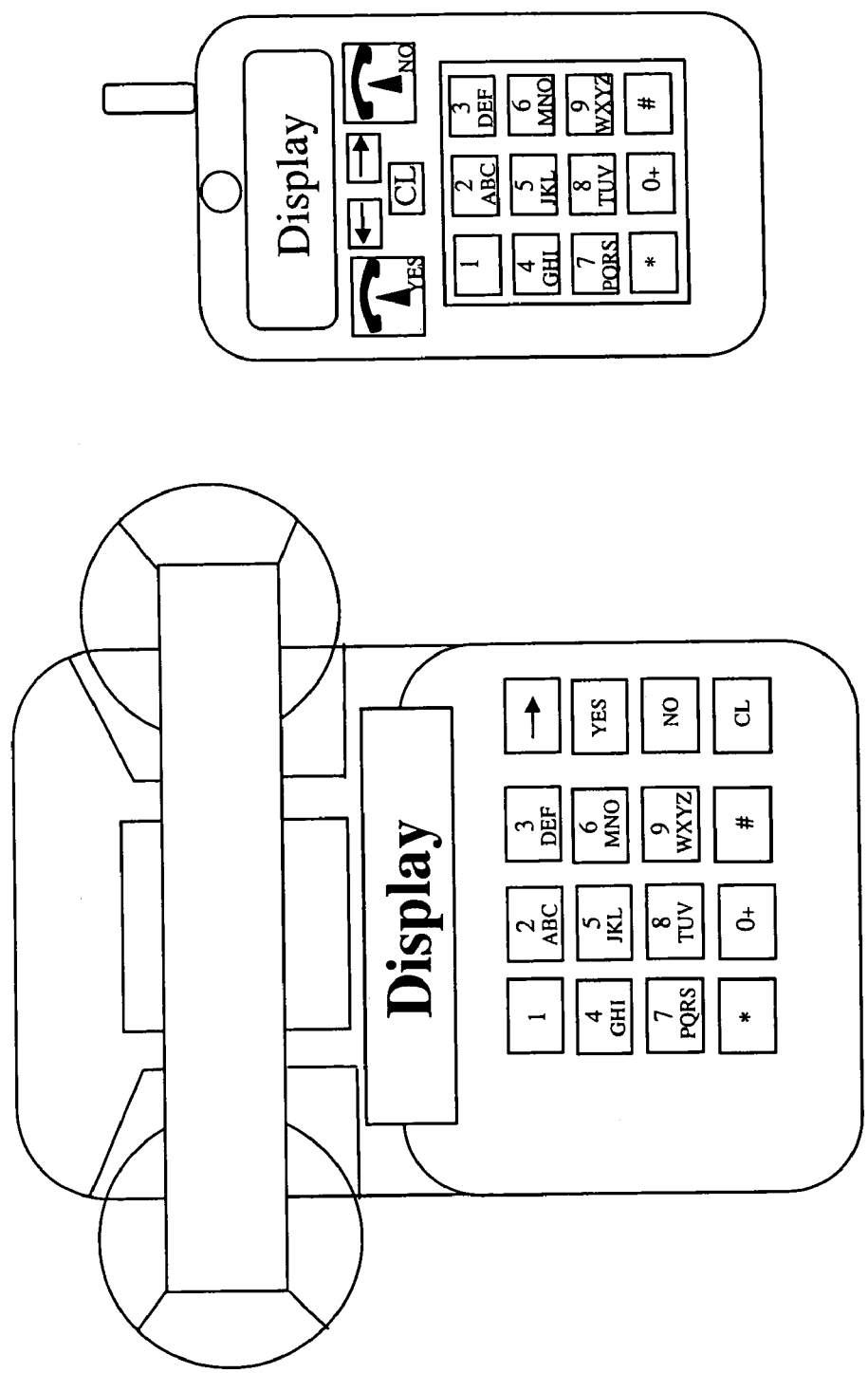
FIG. 1 Example of a Terminal Shell with Minimum Keyboard

FIG. 1 shows two conventional telephones with the addition of alphanumeric characters on the keyboards, as an example. "A" is here a fixed line telephone for an ISDN connection, and "B" is either a conventional cordless telephone, for example based on the Digital European Cordless Standard DECT (Ref. 6), or a cellular phone for the GSM system (Ref. 4) for example.

In each case, the 12-button keyboard serves to choose or enter the alphanumeric name and telephone number in an internal dialing memory, where the additional keys may serve for conventional service operations of the terminal, in connection with a private telephone system or with the telecommunications network.

These terminals may also be used for the ATR method described by this invention, with appropriate modification of the software. In the present case, the terminal may be switched to an editing mode by special keys in order to generate the ATR. Once the ATR is completed, the input is concluded, for example, by pressing the "Start" key, which simultaneously transmits the character string for processing by means of a DSS1 level 3 message (S3M) "setup" to the switching center. As an option, the external connection of an alphanumeric keyboard (such as a PC keyboard via an infrared interface) could be used for easy editing.

For mobile telephones, there is the alternative of the integration of an at least partially alphanumeric keyboard, such as is presently available in some conventional mobile telephones (Ref. 13) or for handheld computers (mini notebook, Palm computer, Personal Digital Assistant, or the like). This should be easier to operate than the alphanumeric input via a multiple overlay keyboard with multiple selections for each key.

Figure 2:
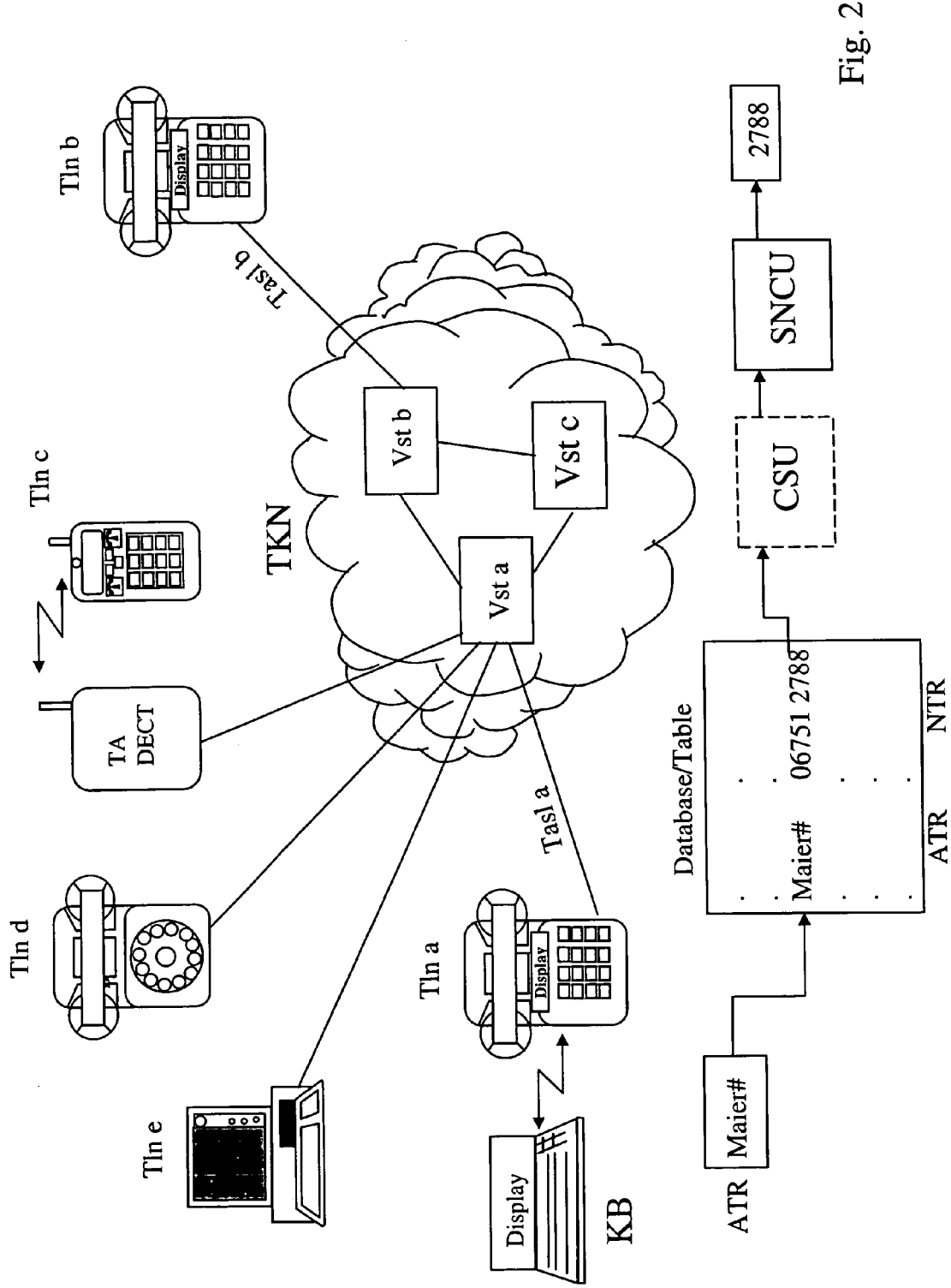
FIG. 2 Schematic of a Network with Address Conversion

FIG. 2 shows an example of the solution described by this invention. A subscriber "A" (Tln a) has a conventional terminal with an optional PC keyboard connected via infrared with a large display screen and is connected to the telecommunications network TKN, which contains, for example, the three switching centers Vst a, Vst b, and Vst c.

The subscriber connection a (Tasl a) of the calling subscriber between Tln a and Vst a uses, for example, the digital ISDN D channel signal protocol DSS1 (Ref. 7). The same applies on Tasl b of the called subscriber (Tln b), who is connected to Vst b in this example. The central character system SS7 (Ref. 1) is used between switching centers.

DSS1 is defined in accordance with the ISO OSI reference model. The Open System Interconnection Standard describes a 7-layer connection model that has become the standard in the data and telecommunications world. It was initially published by the International Standards Organization in 1982 as Standard 7498, and it was accepted by the CCITT (now the International Telecommunications Union ITU) in 1984 as Recommendation X.200 (Ref. 1, page 5). Ref. 1 presents an introduction to the comprehensive ISDN standards of the European Telecommunications Standards Institute ETSI. DSS1 level 1 describes here the physical connection between any 2 points, level 2 describes the assured data transmission between them and level 3 describes the network and the service level. In the present situation, level 2 (Link Access Procedure D Channel/LAPD), which, for example, makes available the safe data transfer protocol and the service interface to level 3 (Ref. 1, page 29), and the level 3 protocol are of interest to guarantee the establishment and end of connections as well as the request of service characteristics on the Tasl (Ref. 1, page 38).

The invention assumes that the minimum technical expenditure as well as compatibility and coexistence with present methods may be used in an overlay method as an additional optional variation relative to the existing call number system with decimal numbers, where the signaling systems in the subscriber area (access network AN) and optionally in the transmission network (backbone network BN) and also optionally in the inter-network or international area (interconnection area IA) may be augmented appropriately.

The complexity of the solution to be realized increases from AN via BN to IN, because the signal protocols in the various technical installations (terminals, switching centers) need to be consistent and implemented. The expenditure to achieve consistency and the implementation will naturally increase with the number of institutions involved. Thus, a scalable method is highly desirable, which can be used from the stand-alone solution in a private network up to the international method.

In addition, it is advantageous to assume that the subscribers can also be contacted via the established numeric dialing method as an alternative to the alphanumeric call number (ATR), because that enables immediate use of ATR identification for all current subscribers-independent of their target networks and their terminals. Thus, initially a numeric string of the current method will be defined, while dialing by name (ATR) is used as an alternative alias dialing method, at least internally to the network.

FIG. 2 shows the conversion of the alphanumeric character string ATR using a conversion table or a corresponding database into a numeric string NTR corresponding to the regular call number of the target subscriber. To facilitate the choice between local databases, it is advantageous to file the complete NTR, including the international prefix, network code, etc., in the database. The required target call number is determined in a second step depending on the location of the switching center on the subscriber's side by omitting or adding certain call number components, which may require the use of an appropriate processing unit (Subscriber Number Calculation Unit SNCU) in the present case, for example. The example shows the selection for the desired target subscriber Maier, who is in the same local calling area in this example. Thus, the solution enables a connection by use of alphanumeric subscriber call numbers for any targets internal or external to a network, for which a corresponding alias (or alternatively a telephone book entry) is stored in the switching center of the initiating subscriber.

The further signaling to establish the connection is then continued with the conventional call number without limitations of any kind imposed from the dialing method of the invention upon the remainder of the network and the network interfaces to other networks.

An additional optional Carrier Selection Unit CSU, in addition to a likewise optional operation procedure (see below), enables the establishment of connections to target subscribers via any alternative network, where the selection may be based, for example, on the manual or automatic selection of carrier name, pricing information or the like, and where it is advantageous that the caller does not need to know the various carrier call numbers in this process.

The Service Access Point Identifier (SAPI) and the Terminal Access Identifier (TEI) are required within level 2 to identify the services and apparatus in the DSS1 protocol. Normally, the level 2 protocol is treated in close proximity, i.e. in the peripheral component group (line card), in a switching center. Special hardware components (chips) are available to handle this, where the level 2 treatment is largely processed independently to reduce the load on the processor (see for example Ref. 11 or 12). In contrast, level 3 protocols are normally handled by a central processing unit, because system-wide resources need to be switched here. The introduction of a particular terminal type for the ATR with a new SAPI and TEI would therefore complicate technical change substantially, because the required change within the switching centers is substantially larger, if changes are made at several protocol levels. In addition, there would also be the requirement to introduce the corresponding terminals on both sides of the communication. In other words, the selection of a particular terminal for the ATR method would raise the cost substantially, which would lead to a corresponding decrease in the rate of adoption on a regional level.

Consequently, it is advantageous to limit the modification to the connection level, namely level 3, in the method described in this invention.

The DSS1 protocol already uses, among others, a coding in the so-called ASCII code (American Standard Code for Information Interchange) for the selection of numbers. This uses the ASCII code directly, for example (FIG. 5, octet 4), or a look-up method uses a 4-bit field to refer to a numeric code in the ASCII table (for example in ISDN sub-addressing, Ref. 9, page 64). This feature allows for the transport of 40 digits in 20 octets. However, the application is restricted to the transfer of decimal numbers. The ASCII code includes also letters and special characters in addition to numbers. The 7-bit code was introduced by ANSI (American National Standards Institute) to achieve compatibility between data services. It consists of 7 bits (128 characters) and a check bit (parity). Ref. 8 explains the acceptance of the standard for telecommunications purposes. The code is described here also as the International Alphabet No. 5, in short IAN. The German version for purposes of data processing also contains Umlauted (DIN 660023). Likewise, other countries have other variations of this character set with national peculiarities. The national character sets are used, for example, in the PC area for text processing etc.

Figure 3:
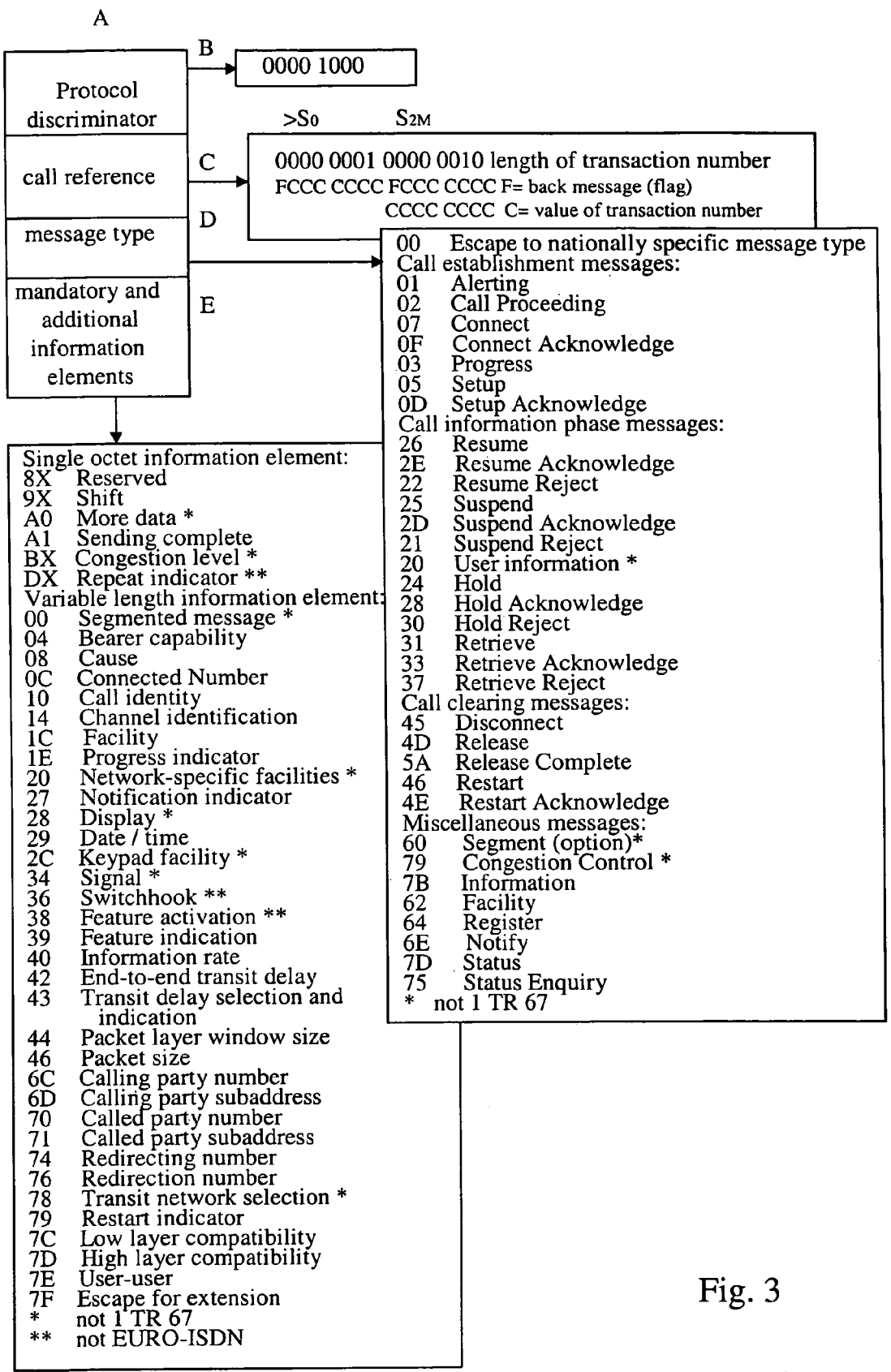
FIG. 3 Level 3 Protocol Elements of DSS1

FIG. 3 shows an overview of DSS1 level 3 protocol elements required to establish a connection. A level 3 message S3M (A) consists always of at least 3 protocol elements, the protocol discriminator PD (B), the call reference CR (C) and the message type MT (D). Depending on the application, there may also be an optional information element IE (E).

The PD is the first octet of a DSS1 level 3 protocol element. It facilitates the distinction among various protocols and their coding. For example, code "08" (an octet in BCD binary codet decimal representation) represents a DSS1 message according to CCITT Q. 931. The range 40 to 47 is reserved for national augmentation and could be used for the labeling of ATK according to this invention. Access via 48-4F (reserved for ETSI) or one of the numerous currently reserved codes (see Ref. 9, page 38) would be useful for internationally coordinated applications of the method. This access would be useful, for example, if the method of this invention is applied in a particular embodiment as a second signal variation in a network and if, for example, the terminals are also characterized as ATR-capable terminals with a new SAP and a new TEI on level 2.

In this situation, all connection-specific messages of level 3 are appropriately conformed for the ATR method.

CR is used for transmission control and is not immediately available.

As an alternative, the following alternative may be used for national or private applications, without requiring a modification of the PD.

The so-called escape sequence (see Ref. 9, page 38) of the MT provides an exit possibility for national augmentation that could be used for the ATR method.

It is less appropriate to use other codes of this protocol element, because that would lead to a deterioration of the structure of the MT.

Figure 4:
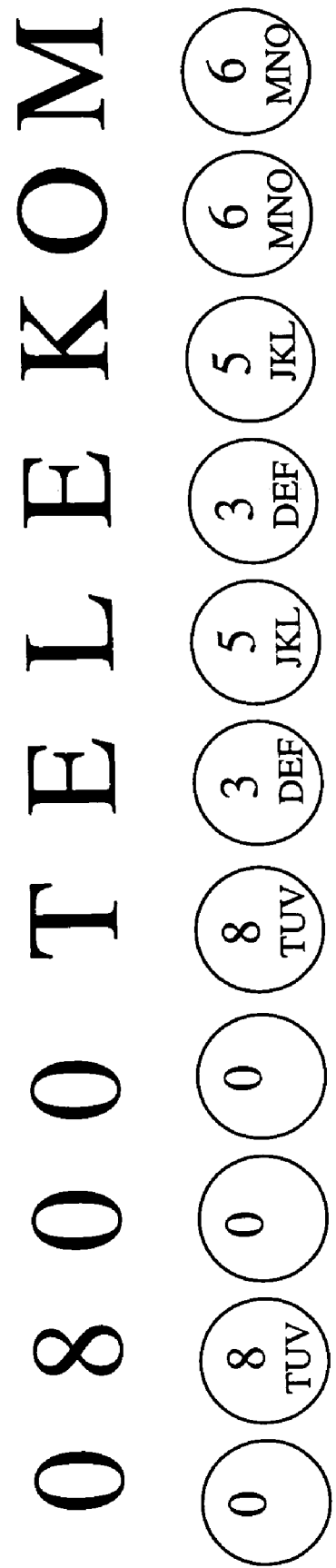
FIG. 4 Vanity Dialing Method

FIG. 4 shows an overview of the IE in another depiction. This shows that it would be proper and sufficient to restrict the modification for a minimum solution to the extent possible to the message type "Setup", because this is the only type that transfers IE call numbers (with an exception for the type "Information"). The coding of NTR in IE is described in Ref. 9, starting on page 41, where those elements are of primary importance, which transfer the call number of the calling subscriber or of the subscriber being called.

For the first approximation it is sufficient that the calling subscriber is identified with his present NTR. As an option, the respective messages, which transfer the call number of the calling subscriber, may be modified in the same manner.

The coding of the IE called party number is shown in an example in FIG. 5 (Ref. 9, after page 58). Here the first octet identifies the IE itself, octet 2 shows the length of the subsequent call number (Length of Called Party Number LCPN). Octet 3 contains a Numbering Plan Identification NPI and a Type of Number Identification TNI. Starting with octet 8, a maximum of 15 digits is transferred.

Here is the transport of the ATR with the minimum need to change. As FIG. 6 shows, the ATR is entered starting with octet 4, where, as Ref. 8 shows, it is most advantageous that the complete character set is available for use. It is likewise most advantageous that octet 2 defines an increased length of the call number, up to a maximum of 255 characters. The standard methods in the ISDN network restrict the call number to at most 20 digits (see Ref. 9, page 58), while the maximum call number according to international standards is currently limited to 15 digits (Ref. 10, page 6). A LCPN of more than 20 and less than 256 is not inconsistent with the international call number convention (Ref. 10), if such a long call number is used merely within the Tasl. Thus, substituting the NTR for the ATR and using it in the network does not generate any restrictions in international traffic.

In addition, the use of a new coding method for the call number needs to be tagged, so that it is recognizable to the switching center. For example, it is most advantageous that this invention uses the code NPI=1001 (private numbering plan) as an indicator for the ATR method. In order to avoid bottlenecks, an embodiment is proposed that modifies the S3M type for this special case appropriately. The entire method for the appropriate modification of the setup message is depicted in FIG. 6.

Octet 4 contains an additional declaration, which allows either for an escape sequence for other private applications or which designates the national character set used for the subsequent ATR method. In this way, it is possible to use various national character sets, so that national differences in characters may be taken into account. The previous example uses the national free slot in the DSS1 protocol for the ATK method. The escape code shown here is specified only until the end of 2000 (Ref. 10, page 1) and will then be replaced, at least in the international area, by a numbering plan identifier (NPI) method that is yet to be defined. The solution variation will then need to be conformed or the proposed operational method needs to be integrated into the international standards, which also has the additional advantage of a network-independent signal for the ATK method. The proposed operation to transfer call numbers may be used in a similar manner also for the other protocol elements of level 3, which transfer call numbers. The cost is relatively small, because this impacts only very few protocol elements.

If necessary, other S3M types can also be modified in a similar manner, when the optional ability to dialogue between EG and TU (telephone book or acknowledgment operation, see below) is used.

The AKT dialing method is primarily suitable for digital networks. Use in analog networks is best restricted to multiple frequency dialing methods. Such a DTMF (Dual Code Multi Frequency) method would optionally require a translation in the terminal and in the switching center to a transfer with a character set of, for example, 256 different codes instead of the usual 16 codes. This is possible in principle as an option. However, given that the terminals and the LCs of the switching centers need to be replaced in their entirety, the cost is substantial, at least for the modification of an existing infrastructure.

As an alternative, it is conceivable to have a signal form where the alphanumeric characters are signaled by the sequential transmission of, for example, 2 numeric codes from the 16-code set. However, this method requires at least an additional software modification on the LCs of the switching centers.

Figure 8:
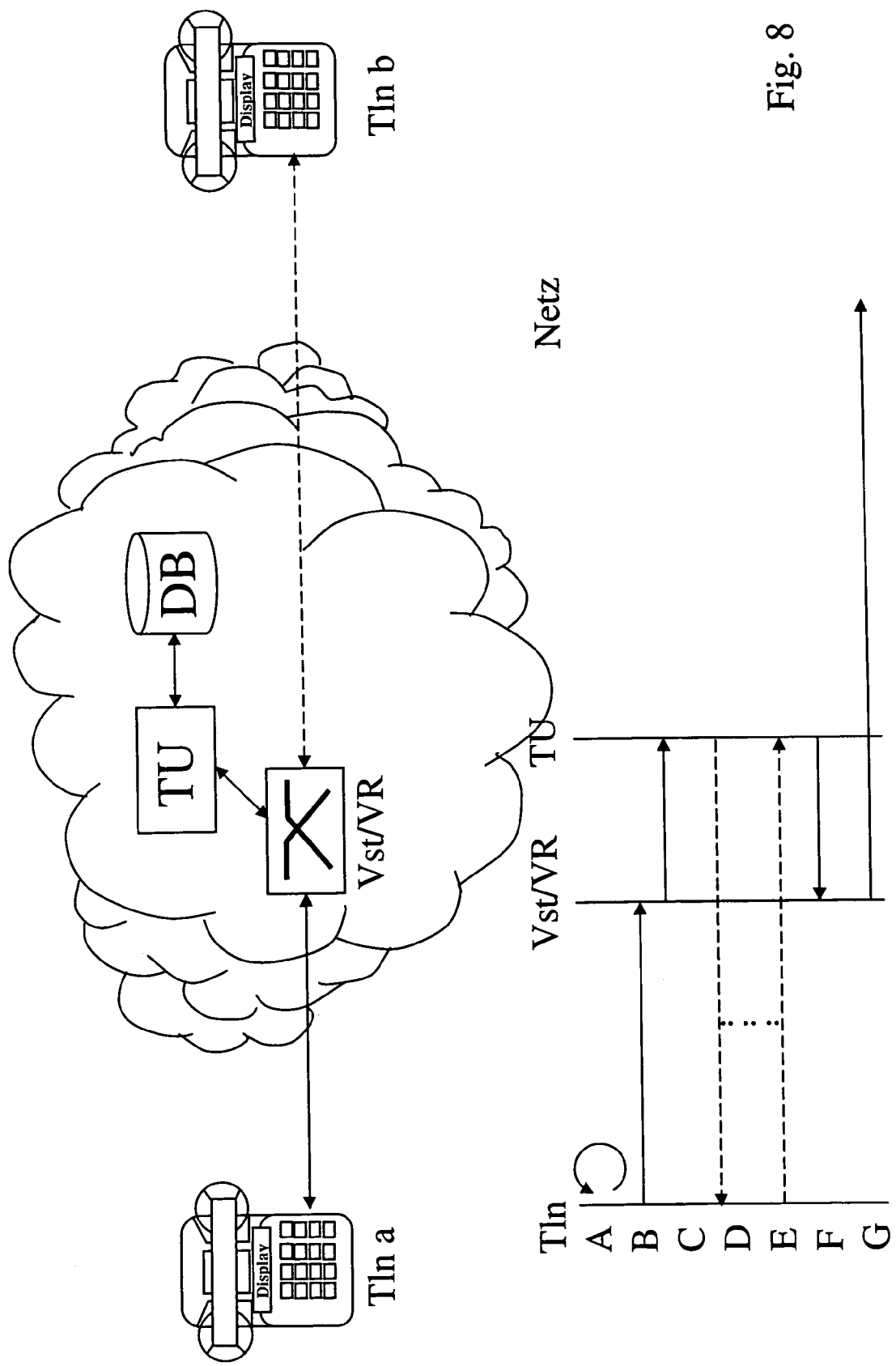
FIG. 8 Signaling System for Address Conversion in the Switching Center

FIG. 8 shows the method to establish a connection in principle. The ATR is first edited in the display of the terminal (A). This may, for example, be done automatically by an appropriate operations system on a local level without input from the switching center. Subsequently, the ATR is transmitted to the switching center (B) to initiate the connection. The connecting computer transmits the S3M to the TU or separates the ATR and transfers it to the TU (C).

As a option, the TU may undertake a menu-driven augmented search and selection of the target phone number, or it may transmit the entire target subscriber identification to the calling subscriber for approval prior to establishing the connection, where the TU may, for example, aid the signal transmission of the switching computer by signaling the terminal with possible call numbers or, for example, transmitting phonebook excerpts, inquiries etc. as an IA5 character string to the terminal, where these are displayed appropriately to be selected by touch and/or to be edited and where these functions are then likewise transmitted as an IA5 character string to the TU, which enables an interactive dialogue between the TU and the EG.

When the TU possesses sufficient information for an unambiguous identification or when the target subscriber has sent an acknowledgment, it transmits the corresponding NTR or the modified S3M with the NTR to the switching computer, which then establishes the connection in a conventional manner. The VR requires no additional input to use the NTR of the calling subscriber as information for the establishment of the connection. As an option, the TU may also convert the call number from NTR to ATR and transmit it to the VR. However, this requires that the ATR is implemented in downstream switching centers and that the terminal of the target subscriber is modified, because an ATR of the calling subscriber has not previously been contained in the existing standards. Depending on the characteristics of the service, certain suitable protocol elements, such as, for example, MP information (7B) in combination with IE display or IE keyboard etc., may be used for the dialogue between TU and EG with appropriate adjustments as needed.

Figure 9:
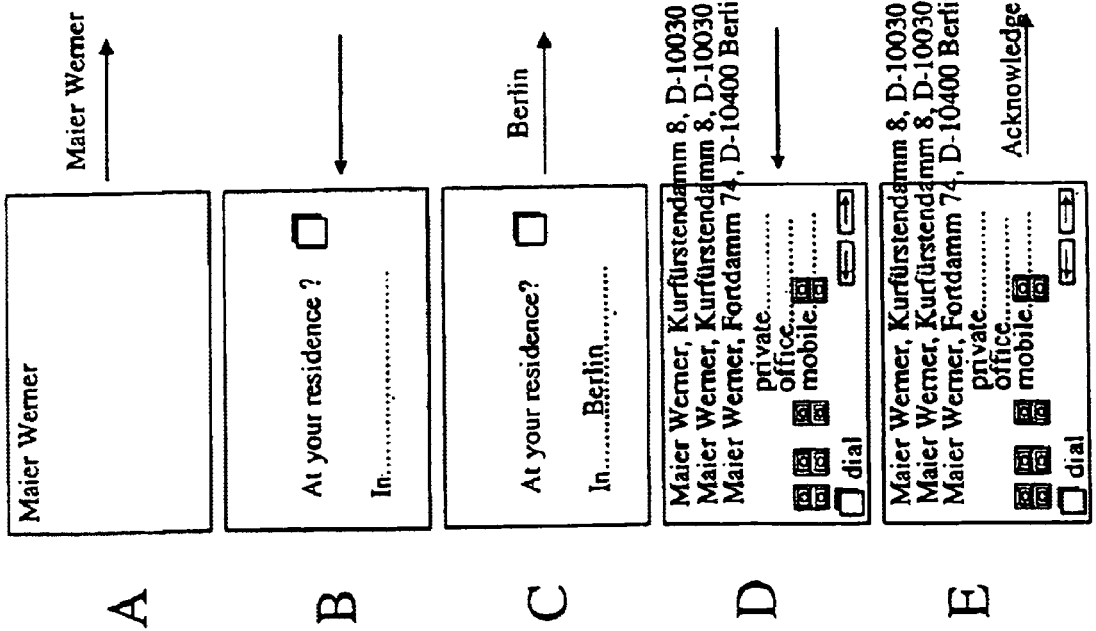
FIG. 9 Example of a Menu for Phonebook Operation during the Establishment of a Connection FIG. 10 Database Structure in the Network FIG. 11 Example of an Embodiment To Convert Addresses with a Database System

For example, FIG. 9 shows dialing by name, where this example assumes an alphanumeric keyboard with a large display and a mouse or trackball to select menu items. In Section A, the caller enters the ATR. Assuming he does not know the complete ATR, he enters only the known portion of the information as search criteria. In the present case, he enters the name Maier Werner (in regular characters with a space).

As an option, the input of place holders (so-called wild cards) is possible, where in analogy to the method used in the personal computer (PC) area, the character"?" indicates a single unknown character and the character "*" indicates a missing string of any length. Thus, the query may be specified as "M?ier Werner", if the caller is uncertain, whether the subscriber's name uses an e or an a. Another possibility would be "M?ier*", if the remainder of the name string is also unclear. In the latter case, it would also not be relevant, whether the name segments are separated by a space or any other character. This information is sent as an ATR to the switching center. However, the TU cannot process this ATR in its present form, because it is not unique here and leads to a further query (here for the location) (B). The caller then enters "Berlin", for example. If this still does not suffice, the TU can initiate a further query, by transmitting a section of the phonebook, for example.

The caller now has the choice to augment the search, which are indicated in this example by some easy search options. Thus, the search may be augmented on the level of the last name ( . . . Meier, Maier, Mayer, . . . ), on the first name ( . . . Walter, Werner, Wilfried, . . . ) or on the address. The possibility for horizontal selection and the extension beyond the edge of the screen indicate that a search on additional information criteria, such as industry sector, keywords, e-mail address, Internet address etc., is also possible.

On the other hand, it is optionally equally possible to initiate the search starting with such alternative criteria. Once the subscriber has found the targeted party (where the current selection may be indicated in color), he finalizes the choice by selection of the corresponding field, where the EG transmits a corresponding acknowledgement to the TU (E).

The productivity of the phonebook selection process may be increased, if the subscriber has optional individual means to influence the process. Thus, there is a possibility to define personal lists (such as P1 . . . Pn or private, firms, restaurants, hobby, etc.) and to download entries from the global phonebook into the personal lists for faster searches. There is also the possibility of associating individual nicknames with any target call numbers in the phonebook, where these nicknames are known only to their author. Examples are Grandma, shop, cellular phone, Paul, Gert, Willi etc. These entries are treated by the TU as a special form of a private list with unique entries, which can therefore be linked to individual subscribers. The TU can respond to individual lists, if the TU can identify the caller. This is guaranteed by having the VR transmit the call number of the caller to the TU for such cases, as an option. Thus, the individual lists can be utilized at least within those networks, where the subscriber has a personal portable call number, such as in cellular telephone networks.

Additional advantages of the method described here result, for example, from entry into the phonebook via industry sector classifications or via the e-mail address or the Internet address. The phonebook can therefore also be used as an address book for e-mail or the Internet—which is a option that no network currently possesses.

Figure 10:
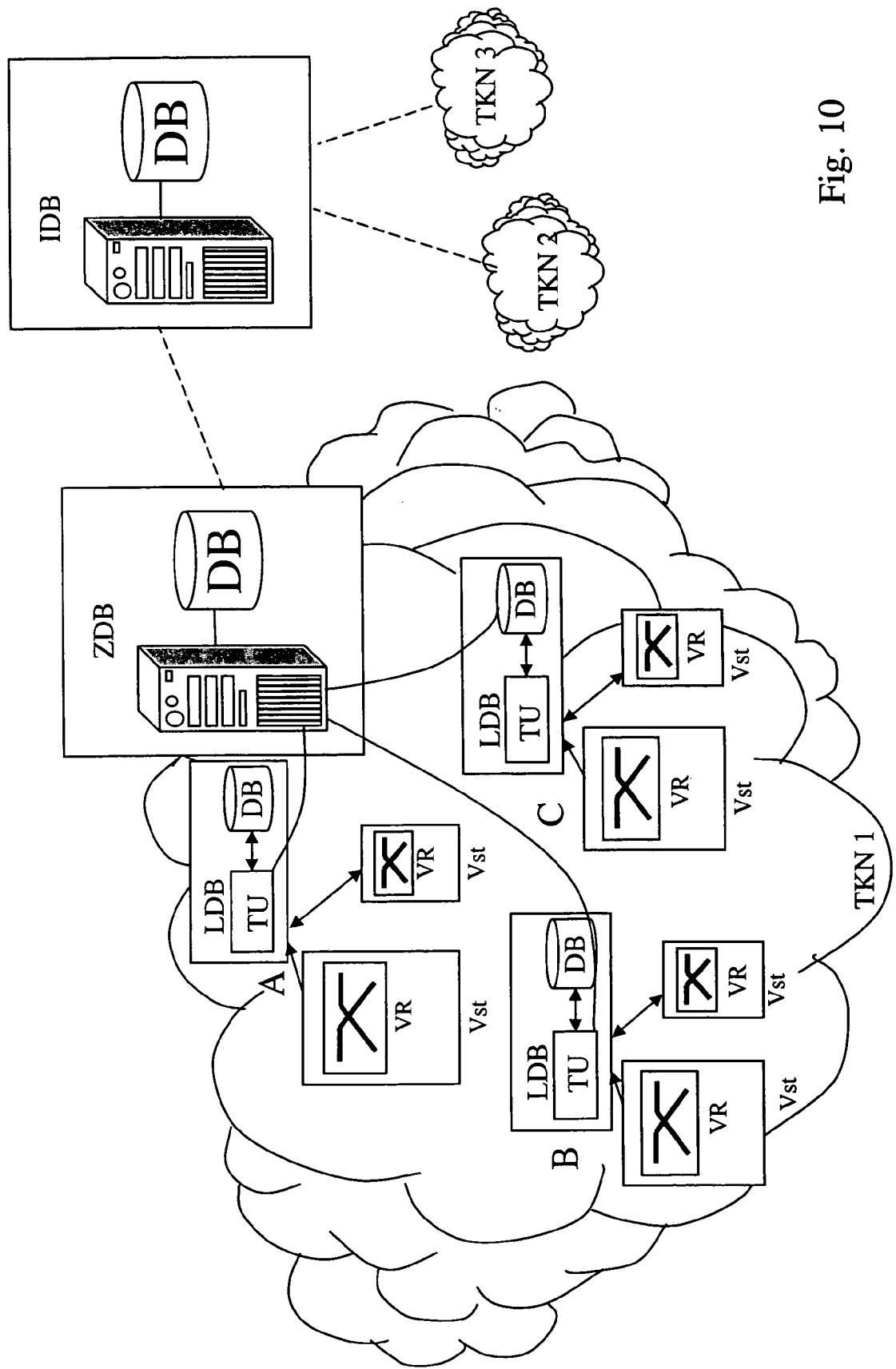

Use of a database system is a likely candidate for such address conversion for the listed reasons and for the expandability. FIG. 10 shows an example of a network implementation of the respective database systems. In this example, database systems A, B, and C each supply two switching centers and are connected to a central database system ZDB to maintain the consistency of the network-wide data. The phonebook entries are produced and updated manually here and will be loaded into the local databases as needed.

Furthermore, FIG. 10 shows examples of alternative networks TKN 1 to TKN 3, whose databases are connected for data transfer and updating purposes, where FIG. 10 shows the connection by the example of an overarching international database IDB.

Figure 11:
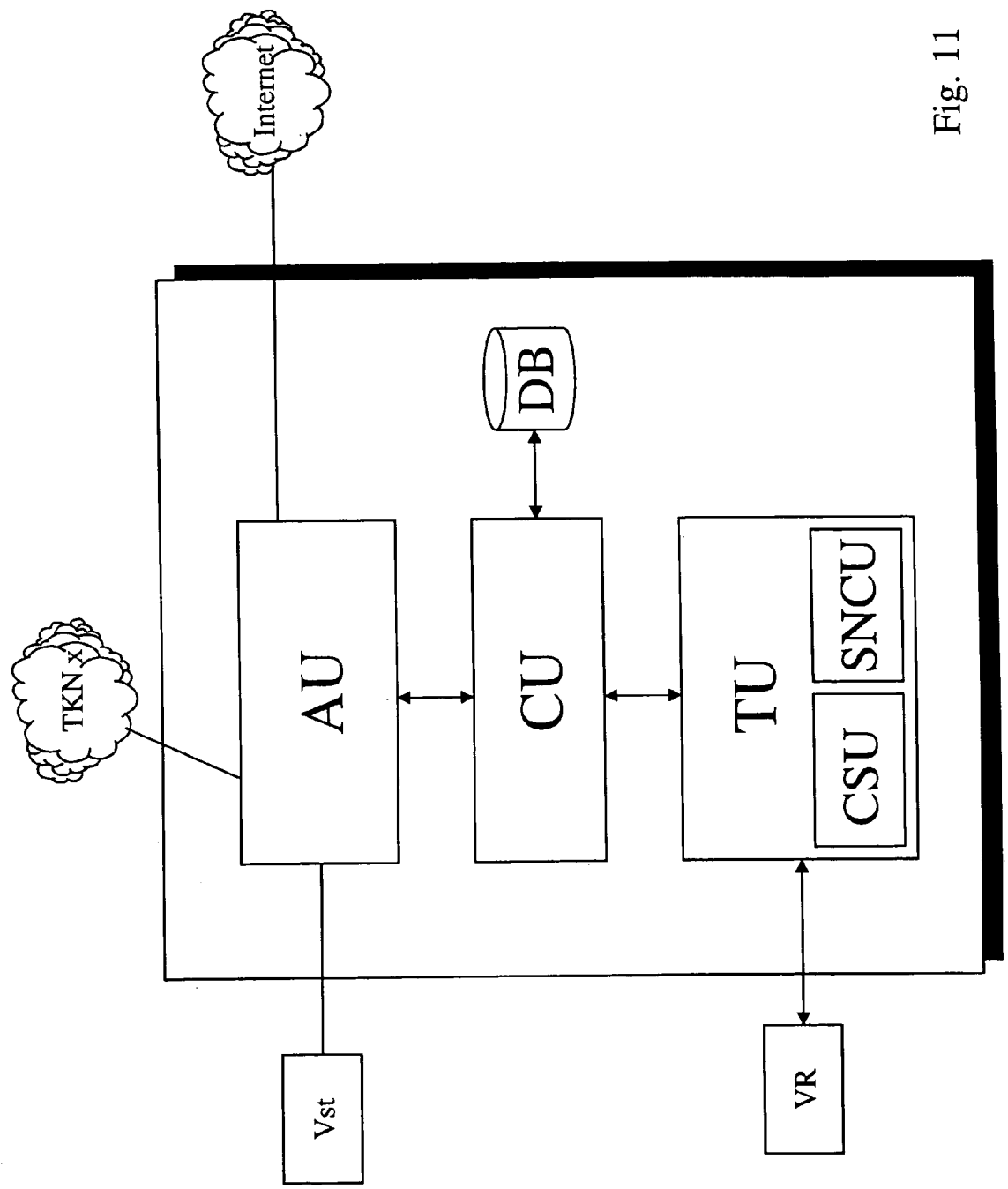

FIG. 11 shows a schematic of a potential embodiment of the address translation with a database system. The address translator TU is connected to the connection processor of the switching center and contains the Subscriber Number Calculation Unit and the Carrier Selection Unit. It is also connected to a Control Unit (CU) for the database itself, which handles the efficient data retrieval and data administration. The Application Unit (AU) facilitates the connection to other networks, here shown as Vst (switching center in the same network), TKNx (any external telecommunication network) and an Internet connection. Signal protocols appropriate to the terminals and networks and access applications for use of the database for an expanded set of customers need to be made available. For example, Internet HTML protocols and also voice-controlled access are good choices. The physical embodiment could include, for example, an off-the-shelf workstation with a standard operating system and a standard database system, but with function-specific software and additional interfaces, where various systems (local, central, international) can essentially be realized by means of various interface configurations and alternative performance characteristics. It is useful to use the AU for the connection between the databases.

Because the method described by the invention defines in principle the exchange of alphanumeric data and menu-driven management input during the establishment of connections between the terminal and the telecommunications network, a logical extension of the proposed method would also enable or optimize other processes in the interaction. For example, telecommunication providers offer a more or less complete set of conventional characteristics. By now, these are also available for analog connections, assuming these use a phone capable of multiple frequency dialing. For example, Ref. 13 shows an embodiment of a shell for a situation, where the input is handled by repeated sequential hits on keys in a complicated order without display support.

The method of the invention could be of assistance here, if it is embodied in the analog network and either processes the signal information in the TU or alternatively feeds it to the applicable service unit of the telecommunications network responsible for control of the comfort characteristics (for example, the intelligent network IN).

The method can also be used for processing conventional service characteristics with alphanumeric menu inputs in digital networks, where the scope of conventional characteristics exceeds the scope specified for international traffic.

ABBREVIATIONS

AN Access Network
ANSI American National Standards Institute
ASCII American Standard Code for Information Interchange
ATR Alphanumeric Subscriber Call Number
AU Application Unit
BCD Binary Codet Decimal
BN Backbone Network
CC Country Code
CCITT ComitéConsultatif International Télégraphique et Telephonique
CR Call Reference
CSU Carrier Selection Unit
DB Database
DECT Digital European Cordless Standard
DTMF Dual Code Multi Frequency
EG Terminal
IA Interconnection Area
IA5 International Alphabet No. 5
IDB International Database
IE Information Element
ITU International Telecommunication Union
LC Line Card
LCPN Length of Called Party Number
MT Message Type
NDC National Destination Code
NPI Numbering Plan Identifier
NTR Numeric Subscriber Call Number
PC Personal Computer
PD Protocol Discriminator
S3M Level 3 Message
SN Subscriber Number
SNCU Subscriber Number Calculation Unit
Tasl Subscriber Connection Line
TKN Telecommunication Network
TU Translation Unit
URL Uniform Resource Locator
VR Connection Processor
Vst Switching Centers

LIST OF REFERENCES

Ref. 1 Zeichengabesysteme [Character Sets], L. T. U. Vertriebsgesellschaft Bremen 1995, ISBN 3-931213-13-7
Ref. 2 ISDN—Die Technik [The Technology], Andreas Kanbiach, Andreas Korber, Hüithig-Verlag Heidelberg 1999, ISBN 3-7785-2288-4
Ref. 3 ITU-T, E. 164, Numbering Plan for the ISDN area, ITU, Geneva, 1988
Ref. 4 The GSM System for Mobile Communications, Michel Mouly, Marie-Bernadette Pautet, Cell & Sys Verlag, France, 1992, ISBN 2-9507190-0-7
Ref. 5 InterNetworking, Petra Barowka, Datacom, International Thomson Publishing Verlag mbH, Bonn, 1998
Ref. 6 ETSI ETS 300 444 Digital European Cordless Telecommunications (DECT) Generic Access Profile (GAP)
Ref. 7 ETSI, ETR 010: ISDN Standards Management (ISM), The ETSI basic guide on the European integrated services digital network, ETSI, March 1993
Ref. 8 CCITT.T50, ISO/IEC646, ISO 7-bit coded character set for information interchange (International Alphabet No. 5 (IA5))
Ref. 9 ETSI, ETS 300 102-1, December 1990, Integrated Services Digital Network (ISDN); User-network interface layer 3, Specifications for basic call control
Ref. 10 ITU-T, E.165.1, Use of escape code "0" within the E.164 numbering plan during the transition period to implementation of NPI mechanism
Ref. 11 Ics for Communications, ISDN Subscriber Access Controller ISAC-S, User's Manual 10.94, Siemens, Munich
Ref. 12 Ics for Communications, Extended Peripheral Interface Controller EPIC User's Manual 10.94, Siemens, Munich
Ref. 13 Bedienungsanleitung für die neuen Komfortleistungen im T-Net [User's Manual for the New Comfort Features in the T-Network], Deutsche Telekom AG, February 1998
Ref. 14 ITU-T, Q.700, Introduction to ITU-T Signaling System No. 7

What is claimed is:

1. A process for using alphanumeric characters for call numbers for connections and for signaling within and between telecommunications networks (call by name), comprising: not using the usual decimal numeric transmission, but rather using alphanumeric signaling information in the form of an alphanumeric subscriber call number ATR for the establishment of a connection in the subscriber access area between the subscriber terminal and the network switching centers, as well as within the telecommunications networks and also among network interfaces between national or international telecommunications networks for the purpose of dialing by name, by e-mail or Internet address; wherein the available alphanumeric character set contains all numbers, all alphabetical characters in both capital and small letters and comprehensive special characters usually used in the computer industry or in the PC industry, such as are included in the international character set, ASCII code according to CCITT.T50, ISO/IEC646 or DIN 660023, where also country-specific variants and unusual characters are feasible by the selection and specification of the code specifications to be transmitted in the transmission protocol; the length of the character string being independent of the geographical position of the caller and target subscriber within a specific network and also independent of the properties of specific single networks, and where it may be specified at will on an individual basis by the target subscriber; using the ATR merely as an alias in the area of the subscriber line between the subscriber terminal of the caller and the corresponding switching center as an alternative signal within the current signal protocols; making a conversion from the ATR to the network-specific subscriber call number NTR in the relevant switching center and wherein thereafter ATR is replaced automatically by network-specific NTR within the signaling protocols for subsequent connection to the target subscriber, which allows a connection by ATR from all terminals that are capable of editing and transmitting of an ATR, while one or more ATR may be defined for all existing target subscribers in any network with any terminal and with any signaling convention; using at least one new alternative alphanumeric character set in signaling on level 3 in connection with an extended address field and a character set for transmission required to establish the connection; wherein within the switching center at the caller side neither the protocol discriminator nor the message type need to modified; the subsequent establishment of the connection and the entire signaling to the target subscriber being handled in a conventional manner with the respective converted conventional NTR with its character set and length of call number, thus with complete transparency to the target subscriber, whether the target subscriber is called by a conventional terminal or by an ATR from an innovative terminal; defining a new terminal type that is capable of editing the ATR within the process to establish the connection, that can be addressed by ATR methods and that remains optionally capable of displaying the ATR of the calling terminal in the display of the terminal being called; introducing a new service and terminal identification in the level 2 protocol within the signaling protocols of the connection between calling and called terminal, using the digital signaling system DSS1 and the central channel character system SS7, wherein the objects Service Access Point Identifier SAPI and Terminal Access Identifier TEI are suitable for the protocols and a new protocol variations is defined within the level 3 messages by the definition of a new protocol discriminator PD; wherein those processes, such as a process for the establishment and set-up of a connection, within the level 3 messages that are involved in the conversion from NTR to ATR also are appropriately modified; and wherein the switching centers involved in the connection receive the required routing or pathway information during transmission of the ATR within the signaling protocols from associated tables or an associated database in order to properly establish the connection to the target subscriber efficiently or forward the information, because the pathway information is no longer contained in the ATR method.

2. A process according to claim 1, wherein the allocation and conversion between ATR and NTR or the determination of the required routing/pathway information take place in an appropriately optimized unit that is separated from the control processor of the switching center and that forms a translation unit TU, which is located either within the switching center or downstream from it and that contains an appropriate call number database DB to administer a large name and call number list, where this structure facilitates the presence of large data sets for expanded call number management and an augmented service for the identification of alterative target call numbers of the same target subscriber or for the determination of the actual ATR in the case of data entry errors by the calling subscriber.

3. A process according to claim 1, characterized by having a second mechanism that conforms and updates all databases from a central database.

4. A process according to claim 1, including a cross-network collection of databases that expand the search and conform and update databases in various networks, where the databases may be administered and maintained either independently or centralized.

5. A process according to claim 1, including facilitating the construction of an international central database as an independent service for various networks, where the datasets or at least the relevant databases in each case can be downloaded into network specific databases and stored in proximity to the switching center to reduce the signaling requirements.

6. A process according to claim 1, including exchanging additional information/messages between TU and subscriber terminal within the process of establishing the connection in such a manner that an interactive menu-driven search for the target subscriber in a phonebook is feasible to aid in the unambiguous identification of the desired target subscriber for at least a partially unknown NTR or ATR, where the access by the caller can be handled in various ways, such as using the ATR, the NTR, the target subscriber, the address, the e-mail address, the internet address, or industry designation.

7. A process according to claim 1, and having an acknowledgment process such that the TU transmits to the caller an augmented unambiguous identification of the target subscriber in the form of name, ATR, NTR, and address prior to transmission of the NTR to the VR for purposes of establishing the connection and where this must be acknowledged by the caller, so that erroneous connections due to an incorrect ATR can be eliminated or at least reduced substantially, and the current disadvantages of available methods, such as the unintended transmission of e-mails, Internet pages or fax messages to the wrong target can be avoided in cases where the target call number or target address is inadvertently mis-specified.

8. A process according to claim 1, wherein: the NTR stored in the database contains the complete national or international call number, all subsidiary databases or databases of alternative networks contain the same data regarding a particular subscriber, a subscriber call number calculation unit SNCU adjacent to the TU reflects the local and network-specific characteristics of the calling and called subscribers, the SNCU can shorten the call number to the numbers required within the same network, the local area or the same exchange, and wherein network-independent or even worldwide alias dialing for the same ATR is feasible, and where the updating of the call number can easily be handled, even if the subscriber moves, changes networks, or obtains multiple access through various networks.

9. A process according to claim 1, wherein the data set for each subscriber in the database contains also listings of alternative access networks, when the subscriber desires to use the same alias for access identification in various networks, where, in contrast to conventional connection processing, the network-specific prefix need not be specified nor dialed by the caller, but where a menu-driven carrier selection is undertaken in the TU in cooperation with a specific carrier selection unit CSU, where the choice of network is either manual or automatic according to various optimization criteria.

10. A process according to claim 9 and having an automatic network selection, where the CSU identifies the currently preferable option with the most favorable pricing structure.

11. A process according to claim 1, and having automatic redialing to achieve a connection via an alternative call number NTR or an alternative access network, if the called terminal is in use or does not accept the call within a set time limit, where the caller is so informed.

12. A process according to claim 1, and including a translation unit TU comprising a software or hardware unit within an IN structure of a network to achieve cost advantages by the expansion of available hardware and database facilities.

13. A process according to claim 1, and having a terminal at the originating site with the possibility to edit the ATR within its operating system, which is independent of the switching center, where the ATR may be input via keyboard keys with multiple alphanumeric assignments, where this operating method is well suited to cellular mobile phones and cordless phones and is thus comparable to previous methods to edit a name for the internal phonebook register, and where alternatively the ATR input uses an integrated alphanumeric keyboard or alternatively uses an alphanumeric external keyboard connected to a phone, where an additional larger display increases the ease and comfort of working with the phonebook.

14. A process according to claim 2, and providing alternative access to the database for customers via the addition of at least one additional processing unit AU, in order to allow for increased value added by enabling subscriber dialing from phone networks, the Internet, at least as a point-to-point connection, and a menu-driven operation/call number look-up in the call number database on the application level.

15. A process according to claim 2, characterized by having the possibility that the caller can work with the call number database to define his own lists within the database, which may be individually designed, where the access into a phonebook search may be made either via the list in question, in which case the content of the list in question is offered as the first selection criteria, where the subscriber-specific call number lists are in each case automatically associated with and administered from the phone number of the originator, such that these lists are not available to other subscribers.

16. A process according to claim 2, and allowing the caller to associate his own individual short aliases with the entries of the call number database, which are administered internally as the special case of an individual call number list with merely a single entry, where the alias correspondence allows for a faster search for the associated call number, or where it may be used as an aid to memory to replace complex ATRs, where the subscriber-defined aliases are automatically associated and administered from the phone number of the originator, so that these lists are not available to other subscribers, where in the extreme each subscriber may use this method to contact a target subscriber via his own individual alias unknown to all other subscribers and the target subscriber.

17. A process according to claim 2, and allowing for a search in the call number database using place holders, where a PC-compatible system with a question mark "?" is used as a replacement for an unknown single character and the asterisk "*" for an unknown string of any length.

18. A process according to claim 1, used in networks with analog signals in the subscriber access area, in addition to use in networks with digital signals, when a suitable method enables the transmission of alphanumeric characters from the ASCII character set, which can be achieved by the introduction of a modified multiple frequency method with a character set of at least 128 different characters, where this requirement can be met by appropriately modified DTMF transmitters and receiver components in the terminal and the switching center or alternatively by the combination of any two multiple frequency codes to a single character.

19. A process according to claim 1, using the alphanumeric signaling method during the dialing process to offer additional conventional service characteristics in association with a display terminal with conventional alphanumeric menu-driven control, wherein conventional service characteristics offered in the Telekom network, which now are operated by a complicated input algorithm with various key sequences, would gain in ease of operation and acceptance.

20. A process according to claim 1, and adding characteristics by means of a TU or alternatively by the transmission of the signaling information in question to the network components already installed for the processing of conventional service characteristics.

21. A process according to claim 1, used also in networks with digital signals in the subscriber access area for the menu-based alphanumeric operation of additional conventional service characteristics, which exceed the scope of the international standardized service characteristics for the network in question.

22. A process according to claim 1, characterized by using several ATRs for each subscriber.

23. A process according to claim 1, characterized by the installation and use of the ATR method to make connections as an additional feature in existing networks parallel to the existing NTR method.

* * * * *

UNITED STATES PATENT AND TRADEMARK OFFICE
CERTIFICATE OF CORRECTION

PATENT NO. : 6,963,638 B1
DATED : November 8, 2005
INVENTOR(S) : Walter Keller

It is certified that error appears in the above-identified patent and that said Letters Patent is hereby corrected as shown below:

Column 15,
Line 10, after "need to" insert -- be --.

Signed and Sealed this

Third Day of January, 2006

JON W. DUDAS
*Director of the United States Patent and Trademark Office*